US010023002B2

(12) United States Patent
Hyde

(10) Patent No.: US 10,023,002 B2
(45) Date of Patent: Jul. 17, 2018

(54) DEVICE FOR HOLDING AN OBJECT DURING ENGRAVING THAT ALLOWS ONE OR MORE DEGREES OF FREEDOM

(71) Applicant: Yamsi Leather and Silver LLC, Chiloquin, OR (US)

(72) Inventor: John Livingston Hyde, Chiloquin, OR (US)

(73) Assignee: Yamsi Leather and Silver LLC, Chiloquin, OR (US)

( * ) Notice: Subject to any disclaimer, the term of this patent is extended or adjusted under 35 U.S.C. 154(b) by 202 days.

(21) Appl. No.: 14/932,504

(22) Filed: Nov. 4, 2015

(65) Prior Publication Data

US 2016/0121644 A1 May 5, 2016

Related U.S. Application Data

(60) Provisional application No. 62/074,789, filed on Nov. 4, 2014.

(51) Int. Cl.
*B23P 11/00* (2006.01)
*B44B 3/06* (2006.01)

(52) U.S. Cl.
CPC .................................... *B44B 3/065* (2013.01)

(58) Field of Classification Search
CPC ..... B23P 5/00; B23P 6/00; B23P 11/00; B23P 13/00
See application file for complete search history.

(56) References Cited

U.S. PATENT DOCUMENTS

| | | | | |
|---|---|---|---|---|
| 3,815,892 A * | 6/1974 | Tulk | B23Q 1/545 248/181.1 |
| 3,880,416 A * | 4/1975 | Horwitz | B25B 1/00 269/152 |
| 5,224,692 A * | 7/1993 | Anderson | B23Q 1/545 269/167 |
| 2016/0121644 A1* | 5/2016 | Hyde | B44B 3/065 29/896.412 |

* cited by examiner

*Primary Examiner* — Lee D Wilson
(74) *Attorney, Agent, or Firm* — Lane Powell, PC; Kevin D. Jablonski

(57) ABSTRACT

An engraving tool for allowing a craftsperson to engrave an object, such a ring or other jewelry, while allowing a discrete number of degrees of freedom but restricting all others. In an embodiment, an engraving tool includes a base portion coupled to a manipulator housing portion that is rotatably attached to the base portion such that the manipulator housing portion may be rotated in a first degree of freedom (e.g., rotated in a horizontal plane with respect to a vertical axis of the base portion). The engraving tool further includes a manipulator secured to the manipulator housing portion in a U-shaped socket such that the manipulator is configured to be rotated in a second degree of freedom (e.g., rotated in one particular vertical plane with respect to the horizontal plane). A ring holder is attached to manipulator and configured to secure a ring for engraving.

16 Claims, 2 Drawing Sheets

DEVICE FOR HOLDING AN OBJECT DURING ENGRAVING THAT ALLOWS ONE OR MORE DEGREES OF FREEDOM

PRIORITY CLAIM

This patent application claims priority to the U.S. Provisional patent application No. 62/074,789 entitled "DEVICE FOR HOLDING AN OBJECT DURING ENGRAVING THAT ALLOWS ONE OR MORE DEGREES OF FREEDOM" filed on Nov. 4, 2014, the entirety of which is incorporated herein by reference for all purposes.

BACKGROUND

Ring engraving as well as other personal item engraving is a popular way of altering jewelry and personal items to have a tailored message or pattern suited to the desires of an owner. Jewelers have honed their draft through years of practice and dedication to develop a skill set for engraving words and designs onto metal items and the like. Such engraving techniques often involve the use of a jeweler's ball vise (or simply a jeweler's ball) that is suited to hold an item, such as a ring, rigidly in place while a craftsperson engraves the item or otherwise examines or works on the rigidly held item.

A conventional jeweler's ball may include a universal ball joint upon which an item clamp and clamp assembly may be attached. Thus, an item to be engraved may be secured in a clamp in order to hold the item in place. Then, the clamp and clamp assembly may be maneuvered about freely (i.e., in a universal manner with all degrees of freedom with respect to an x-axis, a y-axis and a z-axis) to place the item in a desired position for engraving. As the craftsperson completes the engraving in the initial secured position, the craftsperson may then loosen the universal ball join in order to reposition the secured item for the next engraving step. Such a repositioning often involves use of more than one hand such that the craftsperson must set an engraving tool down and then reposition the item being engraved because two hands are required to operate the universal joint. A repositioning process that involves the use of both hands of the craftsperson in cumbersome and time-consuming.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, an apparatus is described herein for allowing a craftsperson to engrave an object, such a ring or other jewelry, while allowing a discrete number of degrees of freedom but restricting all others. In one embodiment, an engraving tool includes a base portion coupled to a manipulator housing portion that is rotatably attached to the base portion such that the manipulator housing portion may be rotated in a first degree of freedom (e.g., rotated in a horizontal plane with respect to a vertical axis of the base portion). The engraving tool further includes a manipulator secured to the manipulator housing portion in a U-shaped socket such that the manipulator is configured to be rotated in a second degree of freedom (e.g., rotated in one particular vertical plane with respect to the horizontal plane). A ring holder is attached to manipulator and configured to secure a ring for engraving.

Thus, an engraver may have a ring secured to a ring holder whereby the ring may be moved easily in a horizontally plane but remains fixed in other planes other than the horizontal plane. Further, a handle affixed to the engraving tool may allow the engraver to loosen the securing of the ring holder so that it may be easily maneuvered in one vertical plane for further engraving from a new position. The engraver may then secure the manipulator and ring holder again after being easily maneuvered by the handle. The handle allows for a rotatable degree of freedom that is not available to a craftsperson having just a jeweler's ball. These and other aspects are better understood as described below with respect to FIGS. 1-4.

Figure 1:
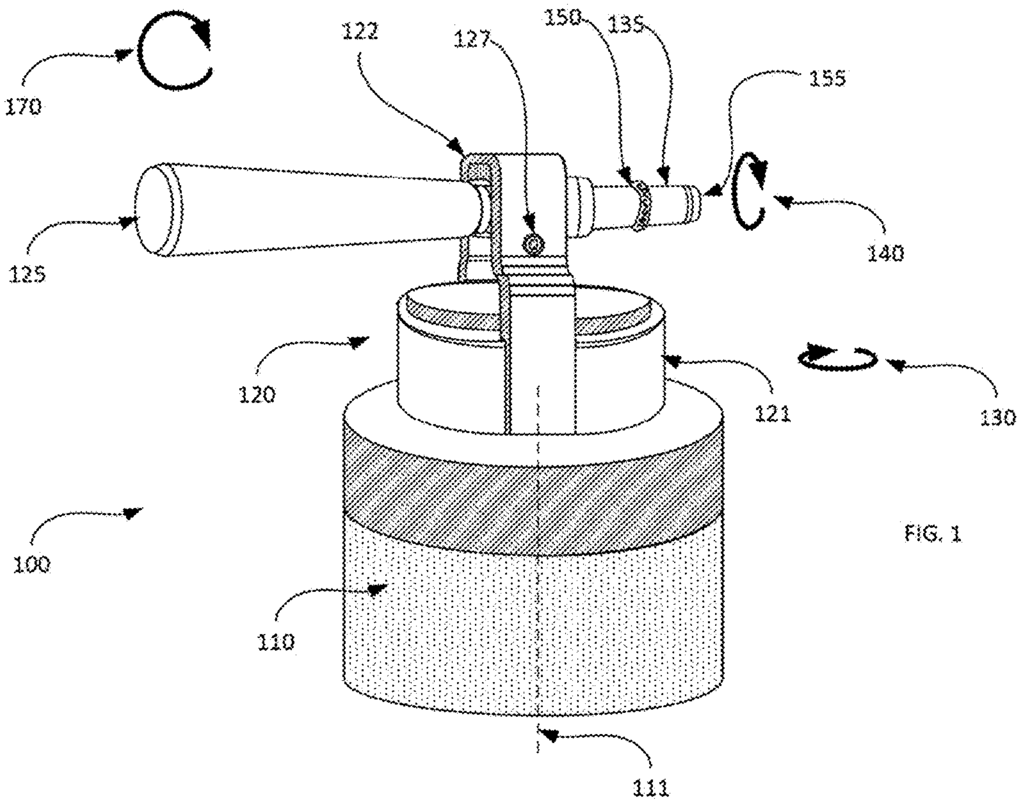
FIG. 1 shows an apparatus for holding an object during engraving that allows for one or more degrees of freedom according to an embodiment of the subject matter disclosed herein.

FIG. 1 shows an apparatus (an engraving tool 100, hereinafter) for holding an object, such as a ring, during engraving that allows for one or more degrees of freedom according to an embodiment of the subject matter disclosed herein. The engraving tool 100 includes a base 110 for mounting to a table or workbench (not shown). In some embodiments, the base 110 may be mounted to a jeweler's ball (also not shown) such that the degree of freedom for establishing an initial orientation of the engraving tool 100 is universal. That is, with any jeweler's ball, the vertical axis 111 of the engraving tool 100 may be set to any direction and then locked into place such that a worker can use the engraving tool 100. Thus, the entire engraving tool 100 may then be locked into place such that only a discrete number of degrees of freedom allowed by the engraving tool 100 remain free. After the conventional jeweler's ball is secured, the engraving tool 100 here provides additional convenience of manipulating an object to be engraved while the jeweler's ball is securely set in place.

The base 110 provides a stable platform by which a manipulation handle housing 120 may be secured. The manipulation handle housing 120 may be rotatably secured to the engraving tool base 110 at a handle housing base 121. In this manner, the entire manipulation handle housing 120 may be rotated in a horizontal plane 130 (e.g., a first degree of freedom). In other embodiments, the manipulation handle housing 120 is secured to the base without an ability to rotate.

The manipulation handle housing 120 includes a U-shaped socket 122 by which a manipulation handle 125 and object holding arm 135 may be secured by a retaining fastener 127. The securing of the manipulation handle 125 restricts the manipulation handle 125 from moving in lateral direction, but still allows for rotational manipulation in a vertical plane 140 (e.g., a second degree of freedom). Thus, any ring 150 placed on the object holding arm 135 may be rotated in the vertical plane 140 as the craftsperson is working without having to dislodge the jeweler's ball.

Rings 150 or other objects may be secured to the object holding arm 135 by slipping the ring 150 over metal or rubber washers (not shown in detail). Initially, the washer (and any ring 150 over the washer) may be loosely resting on the object holding arm 135. Then a securing bolt 155 may be tightened such that as the circumference of the securing bolt 155 within the washer and ring 150 combination gets larger (because the bolt is being drawn into the manipulation arm 125) the washer and ring 150 combination begin to tighten up. In this manner, the ring 150 is then secured from slipping in any direction with respect to the object holding arm 135. There are a number of mechanical ways of securing the securing bolt 155 to the manipulation handle. These aspects are discussed below with respect to FIGS. 2-4.

Once the ring 150 to be engraved is secured to the object holding arm 135, a craftsperson may rotate the entire manipulation handle 125 in the vertical plane 140 with the ring secured to the object holding arm 135 during engraving. Further, the handle housing base 121 may be rotated in the horizontal plane 130 or may be locked into place with another securing mechanism (not shown). With each manipulation point, a craftsperson may lock down another degree of freedom thereby allowing only a discrete number of degrees of freedom desired for particular actions.

Figure 2:
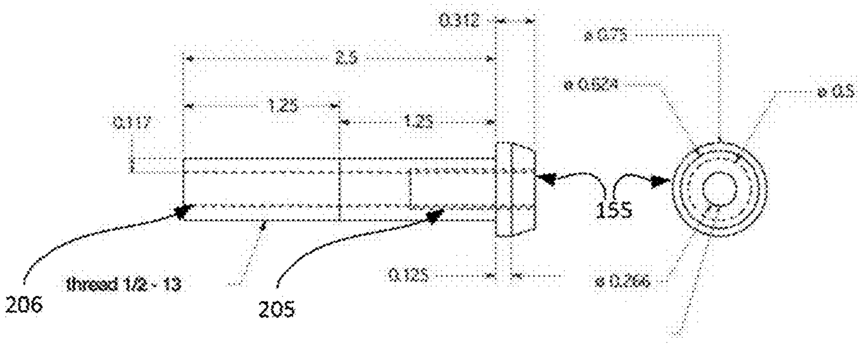
FIG. 2 shows an embodiment of securing bolt for use with the apparatus of FIG. 1 according to an embodiment of the subject matter disclosed herein.
Figure 3:
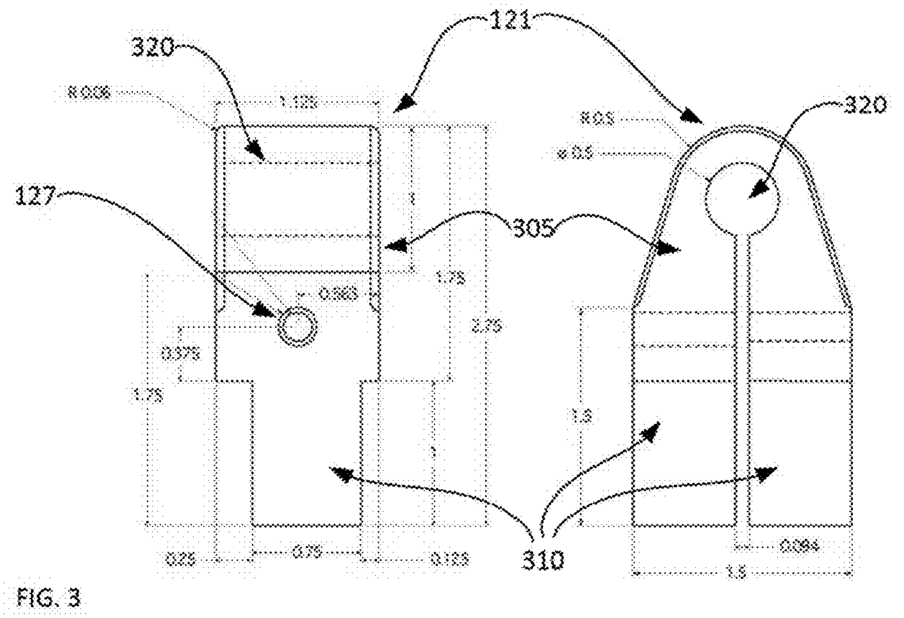
FIG. 3 shows an embodiment of a manipulation handle housing for use with the apparatus of FIG. 1 according to an embodiment of the subject matter disclosed herein.
Figure 4:
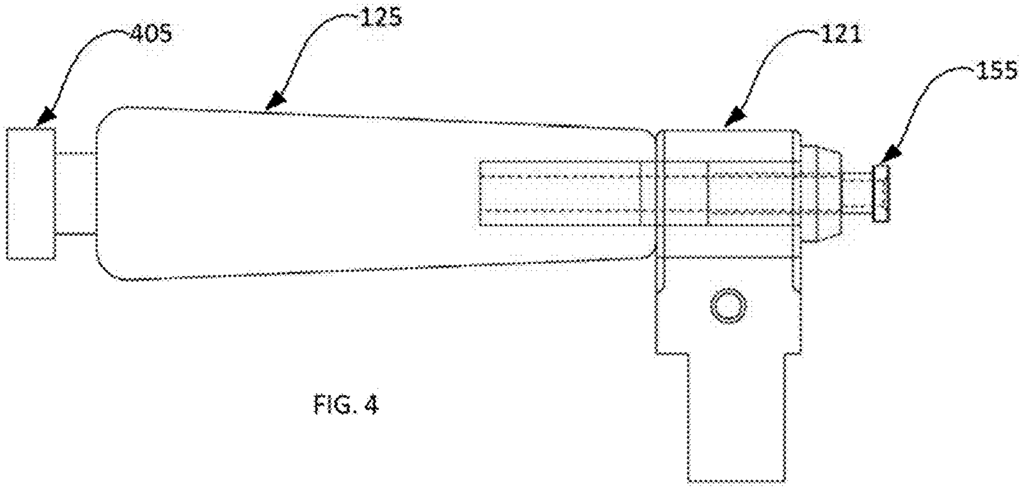
FIG. 4 shows an embodiment of a manipulation handle and a securing bolt for use with the apparatus of FIG. 1 according to an embodiment of the subject matter disclosed herein.

By allowing a discrete number of two degrees of freedom (in the horizontal plane 130 and in one vertical plane 140), the craftsperson can use this engraving tool 100 that is best suited for engraving an object while not allowing movement in other degrees of freedom such as a rotational plane 170 that would correspond to moving the manipulation handle 135 up and down. FIGS. 2-4 show various parts of the engraving tool 100 in greater detail.

FIG. 2 shows an embodiment of securing bolt 155 for use with the engraving tool 100 of FIG. 1 according to an embodiment of the subject matter disclosed herein. As shown in FIG. 1, the object holding arm 135 may be conical with a tapering toward the right end (as shown in FIG. 2) where the securing bolt 155 may be disposed inside of the object holding arm 135. The securing bolt 155 may be attached to a shaft 206 of the manipulation handle 125 in a manner that allows the manipulation handle 125 to be rotated to pull or push the securing bolt 155 toward or away from the manipulation handle housing 120 because of the threaded shaft 205 of the securing bolt 155. In this manner, as the securing bolt 155 is drawn toward the manipulation handle housing 120, the underlying circumference of the object holding arm 135 increases. As any washer and ring 150 combinations that are placed on the surface of the conical section of the object holding arm 135, the securing bolt 155 will expand the conical section. This secures the ring 155 as the increasing circumference of the ring holding arm 135 such that its diameter overtakes that of the inside diameter of the ring 155.

FIG. 3 shows an embodiment of the U-shaped socket 121 of the manipulation handle housing 120 for use with the engraving tool 100 of FIG. 1 according to an embodiment of the subject matter disclosed herein. The U-shaped socket 121 may have a top portion 305 that may be slightly deformed by applying a force to the lower leg portions 310. One such force that may be applied is through the retaining fastener 127, which may be a threaded bolt or screw that may rotated to tighten or loosen the U-shaped socket 121. In this manner, any object, such as a manipulation handle (not shown in FIG. 3) that is disposed inside an aperture 320 in the top portion 305 may be secured or unsecured by tightening or loosening the retaining fastener 127 below the top portion 305.

FIG. 4 shows an embodiment of a manipulation handle 125 and a U-shaped socket 121 for use with the engraving tool 100 of FIG. 1 according to an embodiment of the subject matter disclosed herein. The manipulation handle 125 shows a securing bolt 155 attached via a threaded orifice from the right-hand side of the manipulation handle 125. FIG. 4 does not show an object holding arm that would be disposed over the exposed portion of the securing bolt 155. The securing bolt 155 may be tightened from the right side via an Allen wrench or other suitable tool. Further, if the right end of the securing bolt 155 is covered (from a cap-like object to be engraved), the securing bolt 155 may also be tightened from the left-hand side as the manipulation handle 125 includes a rotatable securing bolt receptacle 405 the extends through the manipulation handle out is exposed at the left-hand side.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. An engraving tool, comprising:
- a base portion;
- a manipulator housing portion rotatably attached to the base portion such that the manipulator housing portion may be rotated in a first degree of freedom;
- a manipulator secured to the manipulator housing portion in a U-shaped socket, the manipulator configured to be rotated in a second degree of freedom; and
- a ring holder attached to manipulator configured to secure a ring for engraving.

2. The engraving tool of claim 1, wherein the first degree of freedom comprises a degree of freedom wherein the ring holder may be rotated in a vertical plane.

3. The engraving tool of claim 1, wherein the second degree of freedom comprises a degree of freedom wherein the ring holder may be rotated in a horizontal plane.

4. The engraving tool of claim 1, wherein the manipulator further comprises a manipulation handle configured to maneuver the ring holder in each of the degrees of freedom.

5. The engraving tool of claim 4, further comprising a securing bolt threadably coupled to a shaft disposed in the manipulation handle and configured to secure the ring to the ring holder.

6. The engraving tool of claim 5, wherein the securing bolt is further configured to expand a circumference of the ring holder when rotated.

7. The engraving tool of claim 1, wherein the ring holder further comprises a conical body comprising rubber.

8. The engraving tool of claim 1, further comprising a jeweler's ball coupled to the base portion.

9. The engraving tool of claim 1, wherein the manipulator housing further comprises a retaining fastener configured to manipulate legs of the U-shaped socket to hold the manipulator in place.

10. An apparatus, comprising:

a base;

a housing attached to the base;

an object holder attached to the housing in a manner that allows a discrete plurality of degrees of freedom for maneuvering the object;

wherein the housing further comprises a U-shaped socket having a retaining fastener configured to manipulate legs of the U-shaped socket to hold the object holder in place.

11. The apparatus of claim 10, wherein at least one of the degrees of freedom comprises a degree of freedom wherein the object may be rotated in a vertical plane.

12. The apparatus of claim 10, wherein at least one of the degrees of freedom comprises a degree of freedom wherein the object may be rotated in a horizontal plane.

13. The apparatus of claim 10, wherein the object holder further comprises a manipulation handle coupled to the housing and configured to maneuver an attached object holding arm in each of the degrees of freedom.

14. The apparatus of claim 13, further comprising a securing bolt threadably coupled to a shaft disposed in the manipulation handle and configured to hold an object to the object holding arm of the manipulation handle.

15. The apparatus of claim 13, wherein the object holding arm further comprises a conical body comprising rubber.

16. The apparatus of claim 10, further comprising a jeweler's ball coupled to the base.

* * * * *